(12) United States Patent
Luebke et al.

(10) Patent No.: US 7,616,432 B2
(45) Date of Patent: Nov. 10, 2009

(54) ELECTRICAL DISTRIBUTION PANEL FOR A NUMBER OF CRITICAL AND NON-CRITICAL LOADS

(75) Inventors: Charles J. Luebke, Sussex, WI (US); Mark A. Juds, New Berlin, WI (US)

(73) Assignee: Eaton Corporation, Cleveland, OH (US)

( * ) Notice: Subject to any disclaimer, the term of this patent is extended or adjusted under 35 U.S.C. 154(b) by 90 days.

(21) Appl. No.: 12/043,514

(22) Filed: Mar. 6, 2008

(65) Prior Publication Data
US 2009/0225501 A1 Sep. 10, 2009

(51) Int. Cl.
*H02B 1/04* (2006.01)
*H01H 9/20* (2006.01)
*H02J 9/00* (2006.01)

(52) U.S. Cl. .................. 361/631; 200/50.32; 200/50.33; 307/64; 361/673

(58) Field of Classification Search ............... 200/50.32, 200/50.33; 361/631, 634, 641
See application file for complete search history.

(56) References Cited

U.S. PATENT DOCUMENTS

| | | | | |
|---|---|---|---|---|
| 4,398,097 A | * | 8/1983 | Schell et al. ................... | 307/64 |
| 5,761,027 A | * | 6/1998 | Flegel ......................... | 361/664 |
| 6,184,595 B1 | * | 2/2001 | Flegel, Jr. ................... | 307/114 |
| 6,621,689 B1 | * | 9/2003 | Flegel ......................... | 361/631 |
| 7,239,045 B2 | * | 7/2007 | Lathrop et al. ................ | 307/80 |
| 7,307,823 B2 | | 12/2007 | Dabrowski et al. | |
| 7,446,270 B2 | * | 11/2008 | Somalingayya et al. .. | 200/50.32 |
| 7,449,645 B1 | * | 11/2008 | Flegel ..................... | 200/51.11 |
| 7,462,791 B1 | * | 12/2008 | Flegel ..................... | 200/50.32 |

* cited by examiner

*Primary Examiner*—Gregory D Thompson
(74) *Attorney, Agent, or Firm*—Martin J. Moran

(57) ABSTRACT

An electrical distribution panel includes first and second power inputs, a first circuit breaker electrically between the first power input and a first load bus, a second load bus, an automatic transfer switch having a first input electrically connected to the first load bus, a second input electrically connected to the second power input, and an output electrically connected to the second load bus. The transfer switch selectively electrically connects one of the first and second inputs to the output thereof. Pairs of circuit breakers each includes a second breaker having a first terminal electrically connected to the first load bus, and a second terminal, a third breaker including a first terminal electrically connected to the second load bus, and a second terminal, a power output electrically connected to the second terminals, and an interlock cooperating with the circuit breaker pair to prevent both of them from being closed simultaneously.

23 Claims, 4 Drawing Sheets

000# ELECTRICAL DISTRIBUTION PANEL FOR A NUMBER OF CRITICAL AND NON-CRITICAL LOADS

BACKGROUND OF THE INVENTION

1. Field of the Invention

This invention pertains generally to electrical distribution panels and, more particularly, to electrical distribution panels accommodating non-critical loads and critical loads being supplied with power from a backup power source in response to power from a primary power source becoming unacceptable.

2. Background Information

Electrical distribution panels, such as load centers, incorporate a plurality of circuit breakers and provide a safe and controllable distribution of electric power. Such load centers have become a common feature in both residential and commercial structures.

A known proposal for either new construction or the retrofit of existing installations involves the addition of a separate load center panel for critical circuits. This separate load center panel receives a backup power source and, also, manually switches between a utility power source and the backup power source. This can be utilized in installations that incorporate the backup power source, such as an electric generator, in the event that the utility power source becomes unacceptable (e.g., without limitation, fails; becomes unreliable; becomes unavailable). This can provide, for instance, reliable electric power for doctor's offices away from hospitals, home-based businesses and home-based chronic patient care support. For existing installations, this requires that the critical circuits be moved (e.g., rewired) from a first load center to the separate load center panel.

One known system employs a single interlock between the main circuit breaker and a manual transfer switch. In response to loss of utility power, the user must first manually turn off any non-critical circuits, turn off the main circuit breaker, and then turn on the transfer switch. The manual sequence is reversed when utility power has returned.

Today, it requires significant time and effort to rewire a load center in order to connect a backup power source, such as an electric generator or other auxiliary power unit (APU) (e.g., a device whose purpose is to provide electrical energy), to critical circuits in, for example, residential and relatively smaller scale commercial structures.

There is also an increased demand for reliable power to homes, particularly in regions with bad weather seasons. Furthermore, there are an increasing number of elderly persons who want to maintain their independent lifestyle and receive healthcare in the home. Hence, in these applications, it is important to provide automatic backup generation and optional surge protection for critical loads including, for example, heating, ventilation and air conditioning (HVAC), medical equipment, refrigeration, and other daily needs.

There is room for improvement in electrical distribution panels.

SUMMARY OF THE INVENTION

These needs and others are met by embodiments of the invention, which provide an electrical distribution panel comprising a first load bus powered from a first circuit breaker and a first power input, a second load bus, a transfer switch including a first input electrically connected to the first load bus, a second input electrically connected to a second power input, and an output electrically connected to the second load bus, and a number of pairs of circuit breakers. The number of pairs of circuit breakers include a second circuit breaker powered from the first load bus, a third circuit breaker powered from the second load bus, a power output powered from the second and third circuit breakers, and an interlock cooperating with the second and third circuit breakers and structured to prevent both of the second and third circuit breakers from being closed at the same time.

In accordance with one aspect of the invention, an electrical distribution panel comprises: a first power input; a second power input; a first circuit breaker including a first terminal electrically connected to the first power input and a second terminal; a first load bus electrically connected to the second terminal of the first circuit breaker; a second load bus; a transfer switch including a first input electrically connected to the first load bus, a second input electrically connected to the second power input, and an output electrically connected to the second load bus, the transfer switch being structured to selectively electrically connect one of the first and second inputs of the transfer switch to the output of the transfer switch; and a number of pairs of circuit breakers, each of the number of pairs of circuit breakers comprising: a second circuit breaker including a first terminal electrically connected to the first load bus, and a second terminal, a third circuit breaker including a first terminal electrically connected to the second load bus, and a second terminal, a power output electrically connected to the second terminals of the second and third circuit breakers, and an interlock cooperating with the second and third circuit breakers and being structured to prevent both of the second and third circuit breakers from being closed at the same time.

The first load bus may be structured to power a number of non-critical loads; and the second load bus may be structured to power a number of critical loads.

The number of pairs of circuit breakers may further comprise means for limiting a maximum count of the number of pairs of circuit breakers in which the third circuit breaker thereof is turned on.

As another aspect of the invention, an electrical distribution panel comprises: a housing; a first power input; a second power input; a first circuit breaker including a first terminal electrically connected to the first power input and a second terminal; a first load bus electrically connected to the second terminal of the first circuit breaker; a second load bus; a transfer switch including a first input electrically connected to the first load bus, a second input electrically connected to the second power input, and an output electrically connected to the second load bus, the transfer switch being structured to selectively electrically connect one of the first and second inputs of the transfer switch to the output of the transfer switch; and a number of pairs of circuit breakers, each of the number of pairs of circuit breakers comprising: a second circuit breaker including a first terminal electrically connected to the first load bus, and a second terminal, a third circuit breaker including a first terminal electrically connected to the second load bus, and a second terminal, a power output electrically connected to the second terminals of the second and third circuit breakers, and an interlock cooperating with the second and third circuit breakers and being structured to prevent both of the second and third circuit breakers from being closed at the same time.

Each of the second and third circuit breakers may comprise a manual operating handle structured to turn a corresponding one of the second and third circuit breakers on or off; the third circuit breaker of a corresponding pair of the second and third circuit breakers may be coupled to the housing proximate the second circuit breaker of the corresponding pair; the second circuit breaker of the corresponding pair may be coupled to the housing in an inverted position with respect to the third circuit breaker of the corresponding pair, in order that the manual operating handle of the second circuit breaker of the corresponding pair moves in a first direction to turn the second circuit breaker of the corresponding pair on and in an opposite second direction to turn the second circuit breaker of the corresponding pair off, and in order that the manual operating handle of the third circuit breaker of the corresponding pair moves in the first direction to turn the third circuit breaker of the corresponding pair off and in the opposite second direction to turn the third circuit breaker of the corresponding pair on.

The interlock may be a mechanical interlock including an elongated member having a first slot receiving the manual operating handle of the second circuit breaker of the corresponding pair and a second slot receiving the manual operating handle of the third circuit breaker of the corresponding pair.

The distance between the first and second slots may be structured to prevent the second and third circuit breakers of the corresponding pair from being both turned on at the same time.

The mechanical interlock may be structured to move the manual operating handle of the second circuit breaker of the corresponding pair to an off position before the manual operating handle of the third circuit breaker of the corresponding pair is moved to an on position.

The mechanical interlock may be structured to move the manual operating handle of the third circuit breaker of the corresponding pair to an off position before the manual operating handle of the second circuit breaker of the corresponding pair is moved to an on position.

The first and second slots of the mechanical interlock may be sized to permit both of the manual operating handles of the second and third circuit breakers of the corresponding pair to be in an off position.

The first and second slots of the mechanical interlock may be further sized to prevent both of the manual operating handles of the second and third circuit breakers of the corresponding pair to be in an on position at the same time.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "electrical distribution panel" includes load centers, panelboards, and other indoor or outdoor panels for distributing electrical power to a number of electrical loads.

The invention will initially be described as applied to miniature single pole circuit breakers, although it will become apparent that it could also be applied to other types of circuit breakers, such as circuit breakers having two, three, four or more poles.

Figure 1:
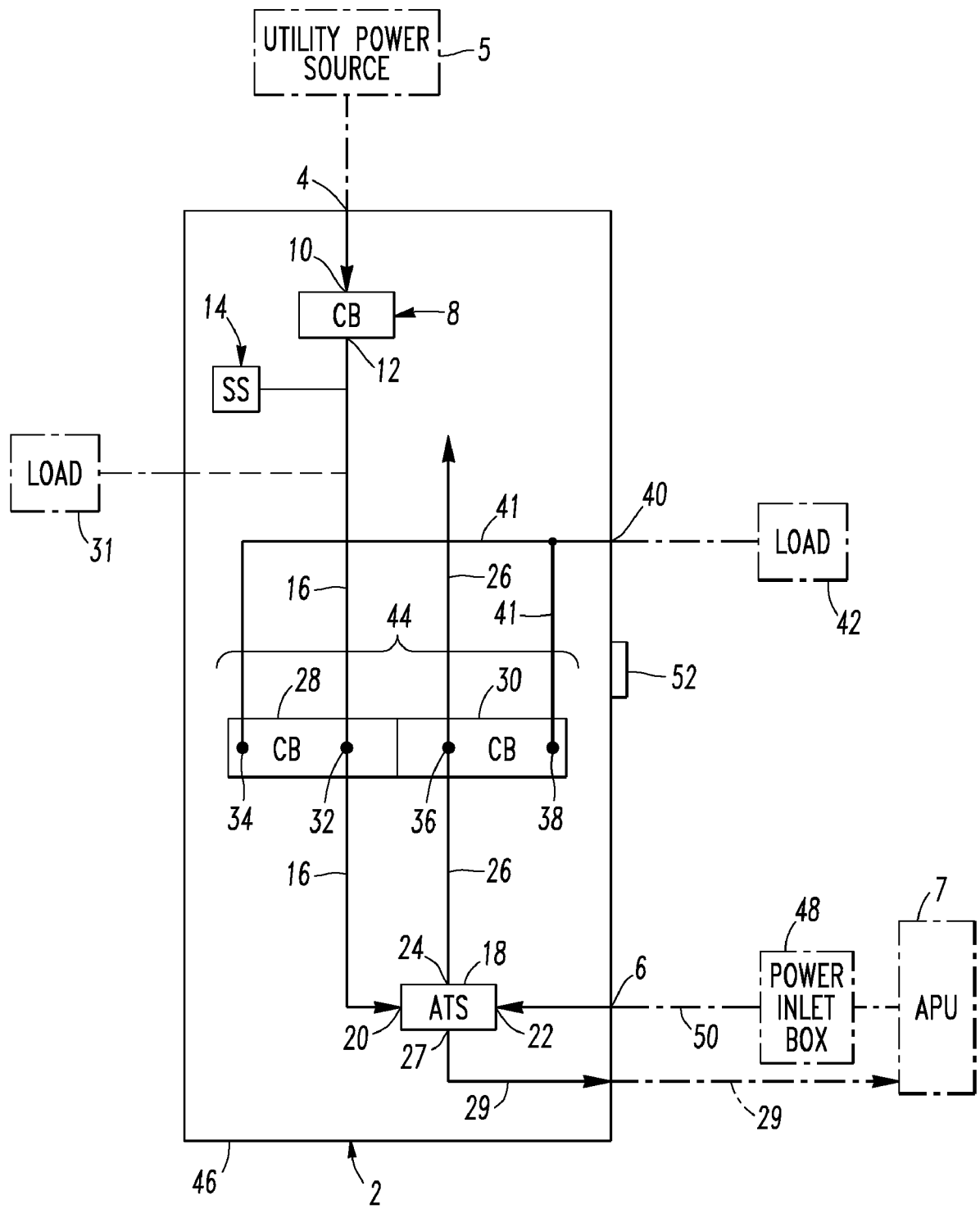
FIG. 1 is a block diagram of a load center in accordance with embodiments of the invention.

Referring to FIG. 1, an electrical distribution panel, such as the example load center 2, includes a first power input 4, a second power input 6, a first circuit breaker (CB) 8 including a first terminal, such as the example line terminal 10, electrically connected to the first power input 4 and a second terminal, such as the example load terminal 12. For instance, the example first CB 8 is a main circuit breaker for the load center 2 and preferably is operatively associated with a suitable surge suppressor (SS) 14, which is electrically connected to the load terminal 12. A non-limiting example of such a surge suppressor 14 is disclosed in U.S. Pat. No. 7,307,823. For example, the surge suppressor 14 is also electrically connected to one or both of a ground conductor (not shown) and a neutral conductor (not shown).

The first power input 4 is preferably structured to receive a primary power source, such as the example utility power source 5 (shown in phantom line drawing), and the second power input 6 is structured to receive a backup power source, such as the example auxiliary power unit (APU) 7 (shown in phantom line drawing). Alternatively, any suitable backup power source may be utilized, such as for example and without limitation, a generator (not shown) or an uninterruptible power source (UPS) (not shown).

The example load center 2 also includes a first load bus, such as a non-critical load bus 16, which is electrically connected to the load terminal 12. An automatic transfer switch (ATS) 18 includes a first input 20 electrically connected to the non-critical load bus 16, a second input 22 electrically connected to the second power input 6, and an output 24 electrically connected to a second load bus, such as the example critical load bus 26. As is well known, the ATS 18 is structured to selectively electrically connect one of its first and second inputs 20,22 to its output 24, in order that the critical load bus 26 is normally powered from the non-critical load bus 16 and, thus, from the line terminal 10 of the CB 8 and the first power input 4, and is, alternatively, powered from the second power input 6 when the first power input 4 (e.g., from the utility power source 5) becomes unacceptable. Although an ATS 18 is shown, any suitable transfer switch, such as a manual (non-automatic) transfer switch can be employed. The ATS 18 preferably includes an output 27 that provides a control signal 29 to the APU 7 to turn on/off automatically when the utility power source 5 is unacceptable/acceptable. The automatic aspect of the example ATS 18 can include one or both of the automatic operation of the control signal 29 from the output 27 and/or the automatic selection and electrical connection of one of its inputs 20,22 to its output 24.

The example load center 2 further includes a number of pairs of circuit breakers, such as the pair including CB 28 and CB 30. It will be appreciated that although only one pair 28,30 is shown for convenience of illustration, a plurality of such pairs may be utilized from the two load buses 16,26. It will also be appreciated that an additional number of circuit breakers (not shown) may be powered from the non-critical load bus 16 for a number of non-critical loads, such as 31. Those number of circuit breakers (not shown), in turn, power a number of loads, such as the example non-critical load 31.

The CB 28 includes a first terminal, such as the example line terminal 32, electrically connected to the non-critical load bus 16, and a second terminal, such as the example load terminal 34. The other CB breaker 30 includes a first terminal, such as the example line terminal 36, electrically connected to the critical load bus 26, and a second terminal, such as the example load terminal 38. The load terminals 34,38 of the pair of CBs 28,30 are electrically connected in parallel. A power output 40 is electrically connected to the load terminals 34,38 of the respective CBs 28,30 by a suitable electrical conductor 41 (e.g., without limitation, a number of wires; a load center bus, which can be employed for suitable commercial circuit breakers that use a "bolt in" style mounting in the load center 2). The power output 40 is also electrically connected to a load, such as the example critical load 42 (shown in phantom line drawing). For example and without limitation, a number of critical loads, such as 42, are selected from the group consisting of a furnace, a heating ventilation and air conditioning load, a refrigerator, a light, a microwave, and a sump pump.

An interlock 44, as will be discussed, for example, below, in connection with FIGS. 3-6, cooperates with the pair of CBs 28,30 and is structured to prevent both of the circuit breakers of that pair from being closed at the same time. As will be discussed, below, in connection with FIGS. 4 and 5, the critical load 42 can readily be configured by the user of the load center 2 to be a critical load (FIG. 5) if the CB 30 is manually closed (in which case the CB 28 is opened by the interlock 44'). Alternatively, the load 42 can readily be re-configured by the user of the load center 2 to be a non-critical load (FIG. 4) if the CB 28 is manually closed (in which case the CB 30 is opened by the interlock 44').

The critical load bus 26 and the non-critical load bus 16 provide support for the critical and non-critical loads 42 and 31, respectively. The non-critical load bus 16 is fed from the main CB 8 and the critical load bus 26 is fed from a suitable transfer switch, such as the example ATS 18. The owner or user of the load center 2 can select and change over time which power circuits can utilize backup power. As such, no electrician is required for rewiring. This allows the owner or user to purchase or borrow a relatively small backup power source (e.g., without limitation, a generator (not shown); the APU 7; and/or an uninterruptible power source (UPS) (not shown)) and only supply "user selected" critical loads 42 as opposed to, for example, sizing the APU 7 and/or UPS for peak demand for all of the critical and non-critical loads 42,31. The example load center 2, which can utilize conventional circuit breakers, such as 28,30, includes the power output 40 fed by the two opposing CBs 28,30 with the interlock 44. The owner or user turns on the CB 28 if the corresponding power circuit is intended to be a non-critical load, such as 31, or turns on the other CB 30 if the corresponding power circuit is intended to be a critical load, such as 42, and, thus, be suitably backup powered.

Preferably, the load center 2 includes a suitable housing 46. Preferably, the second power input 6 is electrically connected to a suitable power inlet box 48 by a suitable electrical conductor 50. In this manner, for example, the APU 7 can be located somewhat remote from the load center 2 (e.g., without limitation, outside of a building (not shown) in which in the load center 2 is suitably mounted).

Preferably, the load center 2 and the number of pairs of the CBs 28,30 include a suitable mechanism for limiting a maximum count of such number of pairs of circuit breakers in which the CB 30 thereof is turned on, thereby providing a critical load powered from the corresponding power output 40. A suitable mechanism determines and limits the number of circuits (i.e., critical loads 42) that can be electrically connected to the critical load bus 26 based upon the size or rating of the backup power source, such as the APU 7. For example, one such mechanism is a label 52 on the load center 2 that states that the number of critical loads turned on should be limited to the size or rating of the backup power source output. For example, the label 52 can include a simple table of typical generator sizes or ratings (wattage) and the maximum number of critical loads. An example of the label 52 is in the form of Table 1, below.

TABLE 1

| Generator Size | Maximum Number of 15 A Circuits On | Maximum Number of 20 A Circuits On |
| --- | --- | --- |
| 3250 W | 2 | 2 |
| 5500 W | 3 | 3 |
| 7000 W | 4 | 4 |
| 10 kW | 6 | 5 |

It should be noted that the example Table 1, like known load tables for generators, are "typical" and not worst case since every power circuit is not typically at full load. Alternatively, it will be appreciated that a different label could be provided that shows actual worst case ratings.

The installation instructions (not shown) for the load center 2 preferably include a list of recommended circuits (loads) to be installed on the critical load bus 26. For example and without limitation, such circuits (loads) can include a number of furnace, HVAC, refrigerator, selected room lighting, microwave, sump pump, and/or other suitable loads.

Preferably, the power inlet box 48 is preinstalled and prewired by an electrician, in order to eliminate the need for a second visit by the electrician when the backup power source (e.g., without limitation, APU 7) is purchased, installed and/or connected (e.g., plugged in) at a later date.

Figure 2:
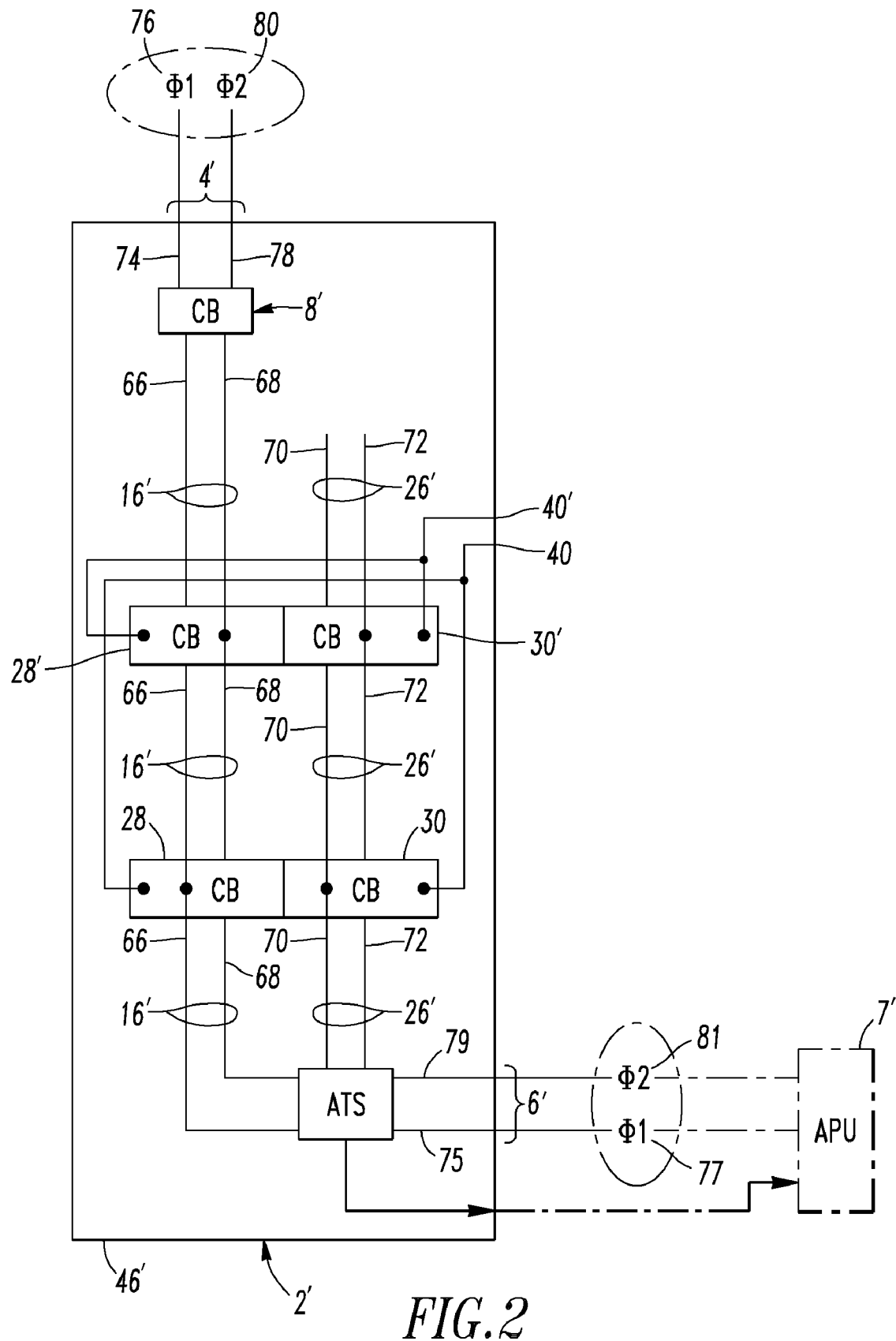
FIG. 2 is a block diagram of a load center in accordance with another embodiment of the invention.

Although not shown in FIG. 1 for purposes of clarity, the load center 2' of FIG. 2 can include a first leg and a second leg, which is shifted by 180 electrical degrees with respect to the first leg. Although not shown in FIG. 1, both legs can still be present. For example, as shown in FIG. 2, the non-critical load bus 16' has two legs 66,68 and the critical load bus 26' has two legs 70,72, which are physically parallel (and opposing) to each of the non-critical load bus legs 66,68 for at least for a portion of the load center enclosure 46'. Similarly, the first power input 4' and the second power input 6' both include a first power leg 74,75 structured to receive a first power phase 76,77 and a second power leg 78,79 structured to receive an opposite second power phase 80,81, respectively. Similarly, the CB 8' and the APU 7' are two-leg (or two-pole) devices. Although the CBs 28,30 are shown as one-pole devices for the first legs 66,70, other CBs 28',30' having a common power output 40' are employed for the second legs 68,72, respectively.

In FIG. 1, a suitable mechanical, electrical and/or electromechanical interlock 44 prohibits both of the two example CBs 28,30 from being on at the same time. For instance, an example mechanical interlock 44' (shown in cross-section) of FIGS. 3-6 prohibits an ON-ON state (FIG. 3) of both CBs 28,30 at the same time. In the ON-OFF state (FIG. 4), the load 42 (FIG. 1) is ON and non-critical, with power being fed from the utility power source 5 (e.g., without limitation, a utility meter (not shown)). For the OFF-ON state (FIG. 5), the load 42 is ON and critical, with power being fed from the utility power source 5 or the backup power source (e.g., APU 7) through the ATS 18. In the OFF-OFF state (FIG. 6), the load 42 is OFF.

Figure 3:
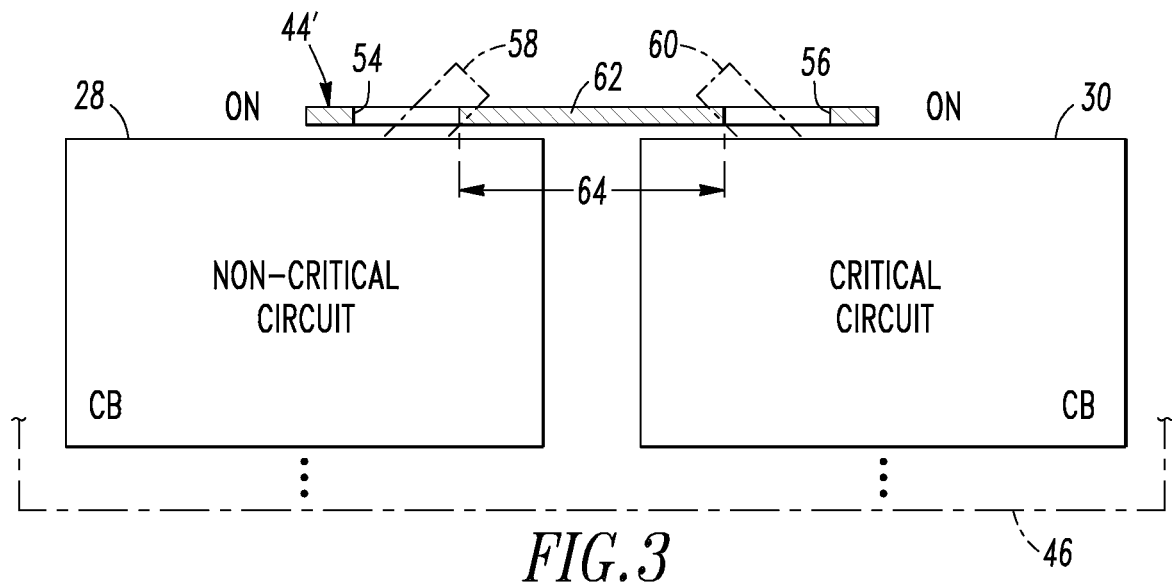
FIGS. 3-6 are simplified vertical elevation views of two of the circuit breakers of FIG. 1 as interlocked by a mechanical interlock.

As shown in FIGS. 3-6, there are two slots 54,56 in the mechanical interlock 44'. Each of the CBs 28,30 includes a manual operating handle 58,60 (shown in phantom line drawing in FIG. 3 to emphasize that this is a prohibited position), respectively, structured to turn a corresponding one of the CBs 28,30 on or off. The mechanical interlock 44' is, for example, slidably disposed above the CBs 28,30. As shown in FIG. 3, the CB 30 of the pair of CBs 28,30 is coupled (e.g., directly; indirectly through the critical load bus 26) to the load center housing 46 proximate other CB 28 of that pair. That other CB 28 is coupled (e.g., directly; indirectly through the non-critical load bus 16) to the housing 46 in an inverted position with respect to the CB 30 of that pair, in order that the manual operating handle 58 of the CB 28 moves in a first direction (e.g., toward the left or counter-clockwise with respect to FIG. 3) to turn the CB 28 off, and in an opposite second direction (e.g., toward the right or clockwise with respect to FIG. 3) to turn the CB 28 on, as is shown. Conversely, the manual operating handle 60 of the CB 30 moves in the first direction (e.g., toward the left or counter-clockwise with respect to FIG. 3) to turn the CB 30 on, and in the opposite second direction (e.g., toward the right or clockwise with respect to FIG. 3) to turn the CB 28 off, as is shown.

Figure 4:
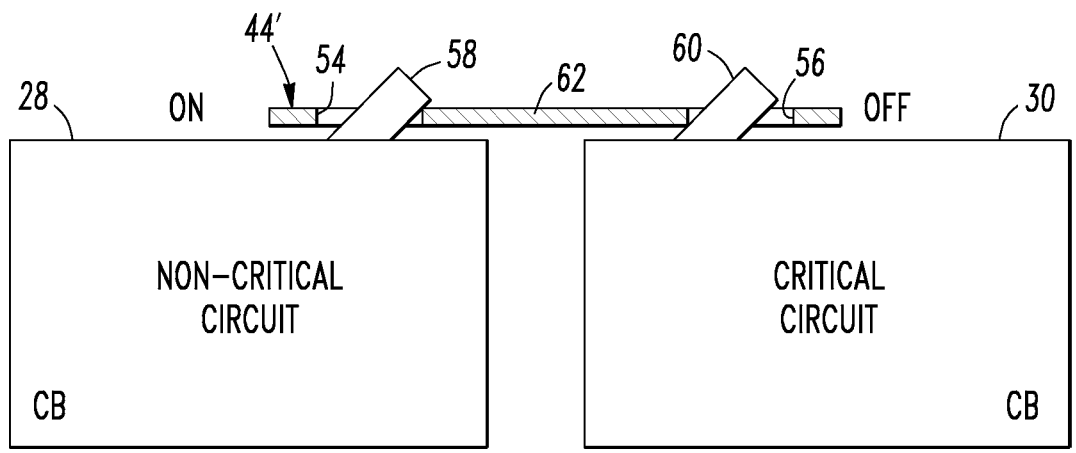
Figure 5:
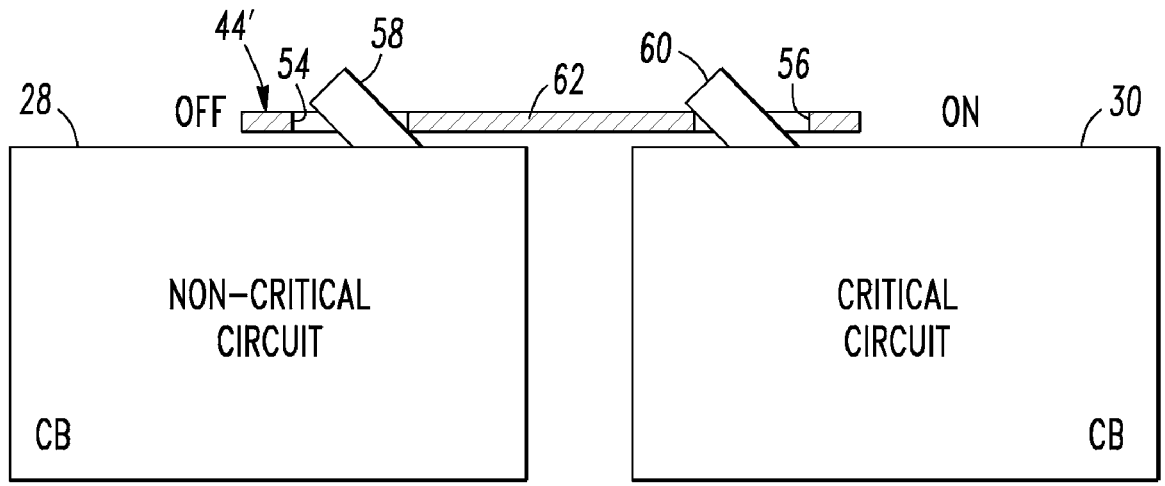

The example mechanical interlock 44' includes an elongated member 62 (shown in cross-section) having the first slot 54 receiving the manual operating handle 58 of the CB 28, and the second slot 56 receiving the manual operating handle 60 of the CB 30. The distance 64 (FIG. 3) between the first and second slots 54,56 is structured to prevent the CBs 28,30 from being both turned on at the same time. The mechanical interlock 44' is structured to move the manual operating handle 58 of the CB 28 to an off position (FIG. 5) before the manual operating handle 60 of the CB 30 is moved to an on position (FIG. 5). The mechanical interlock 44' is structured to move the manual operating handle 60 of the CB 30 to the off position (FIG. 4) before the manual operating handle 58 of the CB 28 is moved to the on position (FIG. 4). The width of the slots 54,56 causes the first CB to turn off before the second CB can turn on. This is what also allows for the off/off position of FIG. 6. Preferably, the closed circuit breaker, such as 28 (FIG. 4), is structured to open or "break" before the open circuit breaker, such as 30 (FIG. 4), closes or "makes". Since there is no phase control to match the APU 7 to the utility power source 5 of FIG. 1, in this example, a "make" before "break" could result in a short circuit and damage the APU 7.

Figure 6:
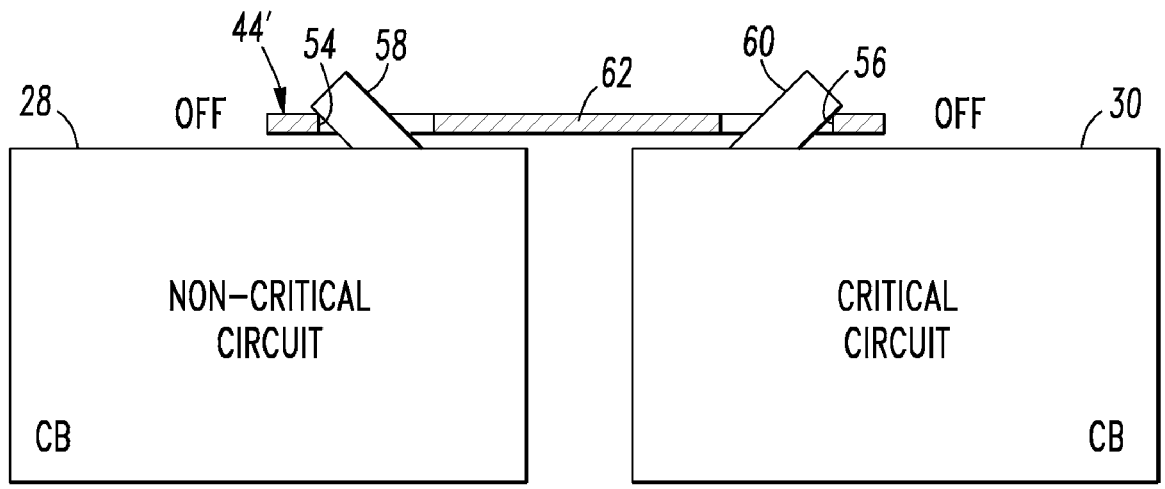

As shown in FIG. 6, the slots 54,56 are suitably sized to permit both of the manual operating handles 58,60 of the CBs 28,30 to be in the off position. Those slots 54,56 are further sized to prevent both of the manual operating handles 58,60 of the CBs 28,30 from being in the on position (FIG. 3) at the same time.

In FIG. 3, the interference between the mechanical interlock 44' and the manual operating handles 58,60 prevents both CBs 28,30 from being ON at the same time. For example, as shown in FIGS. 4 and 5, if the first CB 28 is ON (FIG. 4) and the owner or user tries to close the second (opposing) CB 30, then the mechanical interlock 44' forces the first CB 28 to its OFF position (FIG. 5). Similarly, if the second CB 30 is ON (FIG. 5) and the owner or user tries to close the first (opposing) CB 28, then the mechanical interlock 44' forces the second CB 30 to its OFF position (FIG. 4). As shown in FIG. 6, the slots 54,56 of the mechanical interlock 44' have sufficient clearance to allow both CBs 28,30 to be OFF. Alternatively, any suitable mechanical, electrical and/or electro-mechanical interlock, such as 44 (FIG. 1), may be employed, which provides the same or similar interlock function and prohibits the ON/ON combination (FIG. 3).

The disclosed load center 2 can be sold to, for example, builders of retirement communities, small office buildings, home office type buildings and other homes. This load center 2 can also be designed as a replacement insert for retrofit of existing load center enclosures without requiring a new sub-panel to be installed and the rewiring of power circuits. For example, a new house can be prewired to support plugging in backup (emergency) power. Then, the homeowner or user can later decide to purchase or borrow a backup power source, such as a portable generator, and simply plug it in without requiring an electrician. The CBs 28,30 advantageously permit loads to be readily configured and/or re-configured a number of times to be critical loads or non-critical loads as was discussed above in connection with FIGS. 4-6.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electrical distribution panel comprising:
   a first power input;
   a second power input;
   a first circuit breaker including a first terminal electrically connected to said first power input and a second terminal;
   a first load bus electrically connected to the second terminal of said first circuit breaker;
   a second load bus;
   a transfer switch including a first input electrically connected to said first load bus, a second input electrically connected to said second power input, and an output electrically connected to said second load bus, said transfer switch being structured to selectively electrically connect one of the first and second inputs of said transfer switch to the output of said transfer switch; and
   a number of pairs of circuit breakers, each of said number of pairs of circuit breakers comprising:
      a second circuit breaker including a first terminal electrically connected to said first load bus, and a second terminal,
      a third circuit breaker including a first terminal electrically connected to said second load bus, and a second terminal,
      a power output electrically connected to the second terminals of said second and third circuit breakers, and
      an interlock cooperating with said second and third circuit breakers and being structured to prevent both of said second and third circuit breakers from being closed at the same time.

2. The electrical distribution panel of claim 1 wherein said first power input is structured to receive a primary power source; and wherein said second power input is structured to receive a backup power source.

3. The electrical distribution panel of claim 2 wherein said primary power source is a utility power source; and wherein said backup power source is one of a generator, an auxiliary power unit, and an uninterruptible power source.

4. The electrical distribution panel of claim 1 wherein the first terminal of said first circuit breaker is a line terminal; and wherein the second terminal of said first circuit breaker is a load terminal.

5. The electrical distribution panel of claim 1 wherein said first circuit breaker is operatively associated with a surge suppressor.

6. The electrical distribution panel of claim 1 wherein said first load bus is structured to power a number of non-critical loads; and wherein said second load bus is structured to power a number of critical loads.

7. The electrical distribution panel of claim 6 wherein said critical loads are selected from the group consisting of a furnace, a heating ventilation and air conditioning load, a refrigerator, a light, a microwave, and a sump pump.

8. The electrical distribution panel of claim 1 wherein said number of pairs of circuit breakers are a plurality of pairs of circuit breakers.

9. The electrical distribution panel of claim 1 wherein the first terminals of said second and third circuit breakers are line terminals; and wherein the second terminals of said second and third circuit breakers are load terminals.

10. The electrical distribution panel of claim 1 wherein said power output is electrically connected to the second terminals of said second and third circuit breakers by a wire.

11. The electrical distribution panel of claim 1 wherein said power output is electrically connected to the second terminals of said second and third circuit breakers by a bus.

12. The electrical distribution panel of claim 1 wherein said number of pairs of circuit breakers further comprises means for limiting a maximum count of said number of pairs of circuit breakers in which the third circuit breaker thereof is turned on.

13. The electrical distribution panel of claim 1 wherein said interlock is a mechanical interlock.

14. An electrical distribution panel comprising:
a housing;
a first power input;
a second power input;
a first circuit breaker including a first terminal electrically connected to said first power input and a second terminal;
a first load bus electrically connected to the second terminal of said first circuit breaker;
a second load bus;
a transfer switch including a first input electrically connected to said first load bus, a second input electrically connected to said second power input, and an output electrically connected to said second load bus, said transfer switch being structured to selectively electrically connect one of the first and second inputs of said transfer switch to the output of said transfer switch; and
a number of pairs of circuit breakers, each of said number of pairs of circuit breakers comprising:
a second circuit breaker including a first terminal electrically connected to said first load bus, and a second terminal,
a third circuit breaker including a first terminal electrically connected to said second load bus, and a second terminal,
a power output electrically connected to the second terminals of said second and third circuit breakers, and
an interlock cooperating with said second and third circuit breakers and being structured to prevent both of said second and third circuit breakers from being closed at the same time.

15. The electrical distribution panel of claim 14 wherein each of said second and third circuit breakers comprises a manual operating handle structured to turn a corresponding one of said second and third circuit breakers on or off; wherein the third circuit breaker of a corresponding pair of said second and third circuit breakers is coupled to said housing proximate the second circuit breaker of said corresponding pair; wherein the second circuit breaker of said corresponding pair is coupled to said housing in an inverted position with respect to the third circuit breaker of said corresponding pair, in order that the manual operating handle of the second circuit breaker of said corresponding pair moves in a first direction to turn the second circuit breaker of said corresponding pair on and in an opposite second direction to turn the second circuit breaker of said corresponding pair off, and in order that the manual operating handle of the third circuit breaker of said corresponding pair moves in the first direction to turn the third circuit breaker of said corresponding pair off and in the opposite second direction to turn the third circuit breaker of said corresponding pair on.

16. The electrical distribution panel of claim 15 wherein said interlock is a mechanical interlock including an elongated member having a first slot receiving the manual operating handle of the second circuit breaker of said corresponding pair and a second slot receiving the manual operating handle of the third circuit breaker of said corresponding pair.

17. The electrical distribution panel of claim 16 wherein the distance between said first and second slots is structured to prevent the second and third circuit breakers of said corresponding pair from being both turned on at the same time.

18. The electrical distribution panel of claim 16 wherein said mechanical interlock is structured to move the manual operating handle of the second circuit breaker of said corresponding pair to an off position before the manual operating handle of the third circuit breaker of said corresponding pair is moved to an on position.

19. The electrical distribution panel of claim 16 wherein said mechanical interlock is structured to move the manual operating handle of the third circuit breaker of said corresponding pair to an off position before the manual operating handle of the second circuit breaker of said corresponding pair is moved to an on position.

20. The electrical distribution panel of claim 16 wherein the first and second slots of said mechanical interlock are sized to permit both of the manual operating handles of the second and third circuit breakers of said corresponding pair to be in an off position.

21. The electrical distribution panel of claim 20 wherein the first and second slots of said mechanical interlock are further sized to prevent both of the manual operating handles of the second and third circuit breakers of said corresponding pair to be in an on position at the same time.

22. The electrical distribution panel of claim 14 wherein said first power input and said second power input both include a first power leg structured to receive a first power phase and a second power leg structured to receive an opposite second power phase.

23. The electrical distribution panel of claim 14 wherein said transfer switch is an automatic transfer switch.

* * * * *